United States Patent
Takeyama et al.

(10) Patent No.: US 9,923,227 B2
(45) Date of Patent: Mar. 20, 2018

(54) FUEL CELL END PLATE, METHOD OF MANUFACTURING SAME, AND FUEL CELL

(71) Applicant: TOYOTA JIDOSHA KABUSHIKI KAISHA, Toyota-shi, Aichi-ken (JP)

(72) Inventors: Makoto Takeyama, Toyota (JP); Tateki Takayama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 175 days.

(21) Appl. No.: 14/920,029

(22) Filed: Oct. 22, 2015

(65) Prior Publication Data
US 2016/0133952 A1 May 12, 2016

(30) Foreign Application Priority Data
Nov. 12, 2014 (JP) .................. 2014-229377

(51) Int. Cl.
H01M 8/02 (2016.01)
H01M 8/247 (2016.01)
H01M 8/0256 (2016.01)
H01M 8/0276 (2016.01)

(52) U.S. Cl.
CPC ......... *H01M 8/247* (2013.01); *H01M 8/0256* (2013.01); *H01M 8/0276* (2013.01); *Y02P 70/56* (2015.11)

(58) Field of Classification Search
None
See application file for complete search history.

(56) References Cited

FOREIGN PATENT DOCUMENTS

| JP | 2005203301 A | * | 7/2005 | ............ H01M 8/02 |
|---|---|---|---|---|
| JP | 2006-49129 | | 2/2006 | |
| JP | 4019834 B2 | | 12/2007 | |

OTHER PUBLICATIONS

Goto—JP2005203301A—English Translation.*

* cited by examiner

*Primary Examiner* — Sarah A. Slifka
*Assistant Examiner* — Haroon S. Sheikh
(74) *Attorney, Agent, or Firm* — Finnegan, Henderson, Farabow, Garrett & Dunner. LLP

(57) ABSTRACT

A fuel cell end plate that is provided at an end portion of a fuel cell includes a through-hole which penetrates the end plate and through which at least one of a fuel gas, an oxygen containing gas and cooling water fed to the fuel cell is distributed and a seal which covers an inner circumferential surface of the through-hole and a circumferential edge surface around the through-hole. The cutting processing mark of a corner portion connected from the inner circumferential surface of the through-hole to the circumferential edge surface is a processing mark in which a curved surface processing mark that is formed with a curved surface from any one of the inner circumferential surface and the circumferential edge surface toward the side of the other surface and a linear processing mark that is formed from the curved surface processing mark to the other surface and that is a straight line in a cross section in an axial direction of the through-hole are continuous.

5 Claims, 8 Drawing Sheets

ENLARGED VIEW OF R PORTION

ENLARGED VIEW OF R PORTION

ENLARGED VIEW OF R PORTION

ENLARGED VIEW OF R PORTION

FUEL CELL END PLATE, METHOD OF MANUFACTURING SAME, AND FUEL CELL

CROSS-REFERENCE TO RELATED APPLICATIONS

The present application claims priority from Japanese application P2014-229377 filed on Nov. 12, 2014, the content of which is hereby incorporated by reference into this application.

TECHNICAL FIELD

The present invention relates to a fuel cell end plate and a method of manufacturing it and a fuel cell.

RELATED ART

A fuel cell has a stack structure in which a plurality of fuel cell cells serving as power generation units are stacked in layers, and has end plates at both ends of the stack. This end plate is involved in the supply and discharge of a gas to and from the fuel cell so as to produce an electrochemical reaction, and is also involved in the supply and discharge of a cooling water. Hence, in the end plate, through-holes through which the gas and the cooling water are distributed are provided. It is proposed that since the end plate is formed of a metal such as aluminum, in a through-hole for the supply and discharge of the gas and a through-hole for the supply and discharge of the cooling water, a seal member be provided such that moisture in the gas and the cooling water are prevented from making direct contact with the end plate (see, for example, JP-A-2006-49129).

A failure is found in which as a fuel cell is used, a seal member provided in a through-hole is degraded especially in the vicinity of an R portion of the circumferential edge of the through-hole. An object of the present invention is to avoid a damage in a seal member that seats the supply/discharge through-hole of a gas or cooling water in an end plate.

SUMMARY

In order to solve at least part of the problem described above, the present invention is practiced in aspects below.

(1) According to one aspect of the present invention, a fuel cell end plate is provided. The fuel cell end plate may be provided at an end portion of a fuel cell, and the fuel cell end plate may include a through-hole which penetrates the end plate and through which at least one of a fuel gas, an oxygen containing gas and cooling water used in the fuel cell is distributed and a seal which covers an inner circumferential surface of the through-hole and a circumferential edge surface around the through-hole. A corner portion connected from the inner circumferential surface of the through-hole to the circumferential edge surface includes a cutting processing mark. The cutting processing mark is a continuous processing mark including a curved surface processing mark that is formed with a curved surface from any one of the inner circumferential surface and the circumferential edge surface toward a side of the other surface; and a linear processing mark that is formed from the curved surface processing mark to the other surface and that is a straight line in a cross section in an axial direction of the through-hole.

In the fuel cell end plate of the above aspect, the inner circumferential surface of the through-hole and the circumferential edge surface around the through-hole are sealed with the seal member. In the corner portion in contact with the seal member, the cutting processing mark is present. The cutting processing mark is formed to be a processing mark in which the curved surface processing mark that is formed with a curved surface from any one of the inner circumferential surface and the circumferential edge surface toward the side of the other surface and the linear processing mark that is formed from the curved surface processing mark to the other surface and that is a straight line in a cross section in the axial direction of the through-hole are continuous, and thus the linear processing mark obliquely intersects the inner circumferential surface of the through-hole, with the result that no step is left in the inner circumferential surface of the through-hole. Even if the circumferential edge surface around the through-hole is moved close to or away from the side of the axis of the through-hole or the feeding of the tool leaving the cutting processing mark varies within a predetermined tolerance, the linear processing mark may be formed without any step left in the circumferential surface around the through-hole so as to be continuously extended to the curved surface processing mark. Consequently, in the fuel cell end plate of the above aspect, even when the seal member is significantly contracted by a decrease in temperature, since it is possible to prevent stress concentration from being produced in the part where the inner circumferential surface of the through-hole and the circumferential surface around the through-hole are connected, it is possible to avoid any damage in the seal member.

The behavior and effects of the above aspect of the present invention is described with reference to drawings. As shown in FIG. 8A, a structure is assumed in which a through-hole provided in an end plate made of metal is covered with a seal member including the circumferential edges on the upper and lower sides of the hole. Here, since the coefficient of thermal expansion differs between the end plate and the seal member, a heat cycle is added in which the operation of a fuel cell proceeds to increase the temperature and then the temperature of the battery is decreased, and thus the seal member is significantly expanded and contracted in a repeated manner. By contrast, in the end plate, expansion and contraction are only slightly produced by variations in temperature. When the temperature is repeatedly increased and decreased as described above, in an R portion of the circumferential edge of the through-hole in the end plate, a damage in the seal member may be produced. The present invention is completed by clarifying that such a seal damage is produced as follows. As schematically shown in FIG. 8B, the through-hole of the end plate is formed by a processing method satisfying requirements such as dimension accuracy, for example, cutting processing. The end plate before the processing is thrilled by a method such as casting or diecasting. Hence, the actual external shapes of the R portion of the circumferential edge of the through-hole and the following circumferential wall of the through-hole are affected by the conditions of the formation of the end plate before the processing. Hence, the shapes of the corner curved surface, that is, the corner R portion and the following hole circumferential wall differ depending on the shape of the end plate before the processing, and may differ depending on the through-hole in some cases. When the corner portion of the end plate is processed into an R shape with a cutting tool, by variations in the shape of the end plate, a step may be produced in the inner circumferential surface of the through-hole after the processing. When such a step is present, and the seal member is significantly contracted by a decrease in temperature, in a part corresponding to the step, stress may be concentrated. It is found that consequently, a damage in the seal member may be produced with the step serving as the starting point. In contrast, since a step of the above aspect is unlikely to be produced in the processing mark in the through-hole, the damage of the seal member is reduced, and thus the durability of the end plate is improved.

(2) In the fuel cell end plate of the above aspect, the linear processing mark may be a processing mark which is a straight line that is a tangent from the curved surface in the axial direction of the through-hole in the cross section in the axial direction of the through-hole. In this way, since the curved surface processing mark and the linear processing mark are smoothly continuous without being bent, even in the part where both the processing marks are continuous, stress concentration is prevented from being produced in the seal member. Hence, any damage in the seal member is avoided with high effectiveness.

(3) The fuel cell end plate of the above aspect may be formed by being cast while including the through-hole before receipt of cutting process in which the cutting processing mark is left. In this way, the productivity is enhanced and cost is reduced.

(4) In the fuel cell end plate of any one of the above aspects, the linear processing mark may be a processing mark in which an angle formed by intersection of the straight line with an axis of the through-hole falls within a range of 5 to 45°. In this way, the linear processing mark makes contact with the inner circumferential surface of the through-hole at an angle of 5 to 45°, the continuity of the inner circumferential surface and the circumferential edge surface connected thereto is enhanced and the stress concentration is reliably avoided, with the result that the effectiveness of the prevention of any damage on the seal member is enhanced.

(5) According to another aspect of the present invention, a fuel cell is provided. The fuel cell includes a cell stack in which a plurality of fuel cell cells are stacked in layers and the end plate of any one of the above aspects which is provided at an end portion of the cell stack in a direction in which the cells are stacked in layers. In the fuel cell of the above aspect, the end plate that may avoid any damage on the seal member is included, and thus it is possible to enhance the durability of the fuel cell and increase the life of the battery. In the fuel cell of the above aspect, it is possible to reduce the manufacturing cost by replacing the end plate of an existing fuel cell with the end plate.

(6) According to vet another aspect of the present invention, a method of manufacturing a fuel cell end plate is provided. The aspect is a method of manufacturing a fuel cell end plate provided at an end portion of a fuel cell, and the method may include providing a through-hole which penetrates the end plate and through which at least one of a fuel gas, an oxygen containing gas and cooling water used in the fuel cell is distributed; performing cutting processing on a corner portion connected from an inner circumferential surface of the through-hole to a circumferential edge surface around the through-hole; and arranging a seal member on the corner portion on which the cutting processing has been performed, the inner circumferential surface of the through-hole and the circumferential edge surface. A cutting tool is used in the cutting processing to cut the fuel cell end plate. The cutting tool includes a curved surface processing portion that forms a curved surface processing mark from any one of the inner circumferential surface and the circumferential edge surface toward a side of the other surface and a linear processing portion that forms a linear processing mark from the curved surface processing portion to the other surface. In the method of manufacturing a fuel cell end plate according to the above aspect, it is possible to easily manufacture the end plate that may reduce stress concentration in the part where the inner circumferential surface of the through-hole and the circumferential edge surface around the through-hole are connected.

The present invention may be realized in various aspects, and for example, the present invention may be realized in aspects such as a method of manufacturing a fuel cell end plate, a method of manufacturing a fuel cell, or a cutting edge tool for manufacturing an end plate.

DESCRIPTION OF EMBODIMENTS

Figure 1:
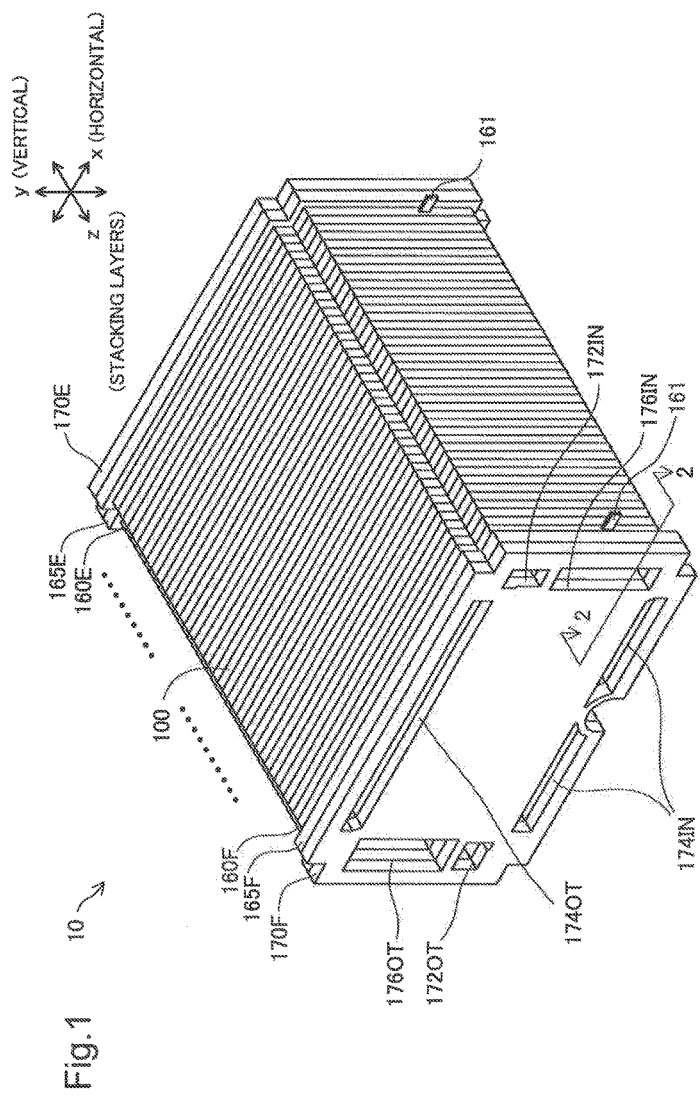
FIG. 1 is a schematic perspective view showing the configuration of a fuel cell according to an embodiment of the present invention.
Figure 2A:
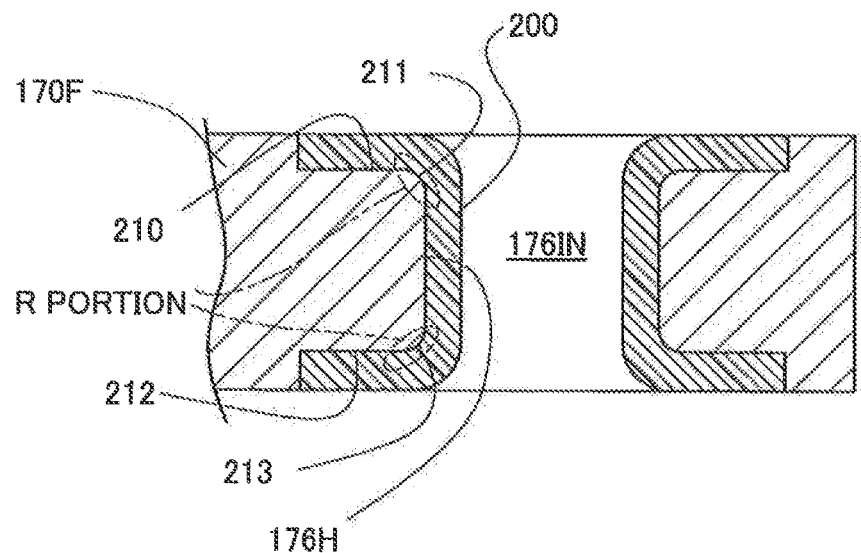
FIG. 2A is an illustrative diagram showing a cross section along line 2-2 in FIG. 1.
Figure 2B:
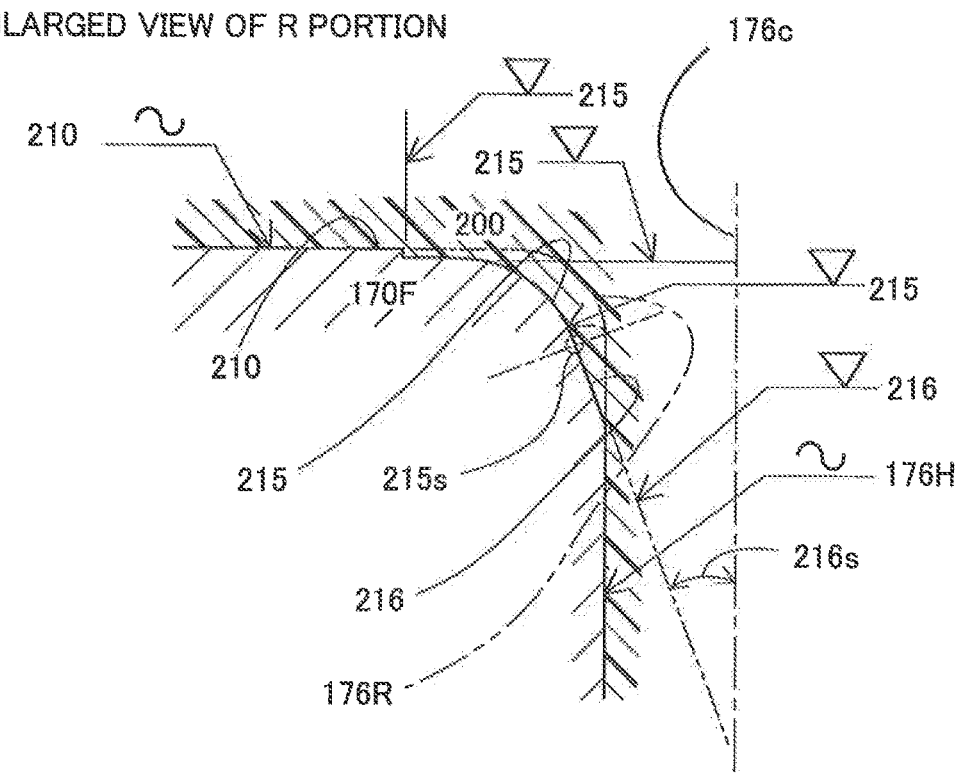
FIG. 2B is an enlarged view of an R portion thereof.

Embodiments of the present invention are described below with reference to drawings. FIG. 1 is a schematic perspective view showing the configuration of a fuel cell 10 according to an embodiment of the present invention, and FIGS. 2A and 2B are illustrative diagrams of an end plate 170F showing cross sections along line 2-2 in FIG. 1. The fuel cell 10 has a stack structure in which a plurality of fuel cell cells, that is, unit cells 100 are stacked in layers in one direction (hereinafter also referred to as a "stacking direction") and the unit cells 100 are sandwiched between a pair of end plates 170F and 170E. The fuel cell 10 has the end plate 170F on the outermost side of the one end. Between a terminal plate 160F that is joined to a termination end of the unit cells 100 stacked in layers and that collects current and the end plate 170F, an insulating plate 165F is interposed. Hereinafter, for convenience, the one end side of the fuel cell 10 where the end plate 170F is provided is referred to as a front end side, and the other end side on the back side of the plane of the figure is referred to as a back end side.

In the fuel cell 10, on the back end side, as on the front end side, the end plate 170E, the insulating plate 165E and the terminal plate 160E of the back end side are provided in this order. The unit cell 100, the terminal plates 160F and 160E, the insulating plates 165F and 165E and the end plates 170F and 170E each have a plate structure that has a substantially rectangular external shape. In each of the plates, a symbol "F" at the end indicates a member on the front end side, and a symbol "E" indicates a member on the back end side. The direction of the long side of the plates is also referred to as an x direction (horizontal direction), the direction of the short side is also referred to as a y direction (vertical direction, perpendicular direction) and the direction in which the unit cells 100 are stacked in layers is also referred to as a z direction.

The terminal plate 160F on the front end side and the terminal plate 160E on the back end side are the current collector plates of generated power of the unit cells 100, and the collected power is output from the current collector terminal 161 to the outside.

The end plate 170F, the insulating plate 165F and the terminal plate 160F on the front end side have a fuel gas supply hole 172IN and a fuel gas discharge hole 172OT, an oxidizing gas supply hole 174IN and an oxidizing gas discharge hole 174OT and a cooling water supply hole 176IN and a cooling water discharge hole 176OT. These supply/discharge through-holes are coupled to communication holes (not shown) for the supply and discharge provided in positions corresponding to the unit cells 100 to form supply/discharge manifolds of gas and cooling water corresponding thereto. On the other hand, in the end plate 170E, the insulating plate 165E and the terminal plate 160E on the back end side, these supply/discharge through-holes are not provided. This is because the fuel cell is a fuel cell of a type in which reaction gases (fuel gas and oxidizing gas) and cooling water are supplied from the end plate 170F on the front end side through the communication holes for the supply provided in the unit cells 100 to the unit cells 100 and a discharge gas and a discharge water from the unit cells 100 are discharged through the communication holes for the discharge provided in the unit cells 100 from the end plate 170F on the front end side to the outside through the discharge manifold. However, the fuel cell is not limited to this configuration, and for example, various types may be adopted such as a type in which the reaction gases and the cooling water are supplied from the end plate 170F on the front end side and the discharge gas and the discharge water are discharged from the end plate 170E on the back end side to the outside.

The oxidizing gas supply hole 174IN is arranged in an outer edge portion of a lower end of the and plate 170F on the front and side along the x direction (long side direction), and the oxidizing gas discharge hole 174OT is arranged in an outer edge portion of an upper end along the x direction. The fuel gas supply hole 172IN is arranged in an outer edge portion of a right end of the end plate 170F on the front end side and in an upper end portion in the y direction (short-side direction), and the fuel gas discharge hole 172OT is arranged in an outer edge portion of a left end and in a lower end portion in the y direction. The cooling water supply hole 176IN is arranged in a lower side of the fuel gas supply hole 172IN along the y direction, and the cooling water discharge hole 176OT is arranged in an upper side of the fuel gas discharge hole 172OT along the y direction. The fuel gas supply hole 172IN and the fuel gas discharge hole 172OT in the end plate 170F are involved in the supply and discharge of the fuel gas to and from the unit cells 100. Likewise, the oxidizing gas supply hole 174IN and the oxidizing gas discharge hole 174OT are involved in the supply and discharge of the oxidizing gas, and the cooling water supply hole 176IN and the cooling water discharge hole 176OT are involved in the supply and discharge of the cooling water.

Each of these supply/discharge through-holes has a so-called round shape in which corners are rounded when the end plate 170F is seen in plan view, and therewithin, a seal member 200 is provided as in the cooling water supply hole 176IN illustrated in FIG. 2A. In each of the supply/discharge through-holes, as in the cooling water supply hole 176IN, both opening portions of the through-hole are widened, and the seal member 200 is arranged so as to cover the inner circumferential surface of the through-hole from the opening portions. The seal member 200 provided in the supply/discharge through-hole is formed of a resin or a rubber that has a sealing property and an insulation property, such as an ethylene-propylene-diene rubber (EPDM), a nitrile rubber (NBR), a silicone rubber, a butyl rubber, an acrylic rubber, a fluorine rubber, an ethylene-propylene-based rubber, a styrene-based elastomer and a fluorine-based elastomer, and seals a hole circumferential well 176H from a hole circumferential edge 210 at one end of the cooling water supply hole 176IN to a hole circumferential edge 212 at the other edge including the hole circumferential edge 210 and the hole circumferential edge 212. In other words, the seal member 200 covers the inner circumferential surface serving as the surface of the hole circumferential wall 176H, the circumferential edge surface serving as the surface of the hole circumferential edge 210 and the circumferential edge surface serving as the surface of the hole circumferential edge 212. Each of the supply/discharge through-holes described above is divided into a plurality of supply/discharge through-holes in the unit cells 100.

As described above, the end plate 170F having the supply/discharge through-holes involved in the supply and discharge of the fuel gas, the oxidizing gas and the cooling water is a casting plate of aluminum, and at the time of casting, the supply/discharge through-holes described above, specifically including supply/discharge though-holes before cutting processing for fitting the seal member 200 are formed by being cast.

In the end plate 170F of the present embodiment, when the seal member 200 is provided in the cooling water supply hole 176IN, cutting processing marks are present in a supply/discharge through-hole one end side part 211 which is a corner portion connecting from the hole circumferential edge 210 to the hole circumferential wall 176H and in a supply/discharge through-hole other end side part 213 which is a corner portion connecting from the hole circumferential edge 212 to the hole circumferential wall 176H. The cutting processing mark is shown in FIG. 2 which is an enlarged view of a R portion, and in the illustrated cross section of the supply/discharge through-hole one end side part 211, the cutting processing mark is a processing mark in which a first processing mark 215 serving as a corner curved, surface from the side of the hole circumferential edge 210 and a second processing mark 216 serving as a straight line that extends from the corner curved surface in the direction of the axis 176c of the cooling water supply hole 176IN to obliquely intersect the axis 176c are continuous. The first processing mark 215 corresponds to a curved surface processing mark in the present application, and the second processing mark 216 corresponds to a linear processing mark. In the end plate 170F of the present embodiment, the first processing mark 215 is formed in the shape of a corner curved surface corresponding to a design shape, and is left on part of the surface of the hole circumferential edge 210. The second processing mark 216 extends in the direction of the axis 176c of the cooling water supply hole 176IN as a tangent from an arbitrary contact 215s on the corner curved surface of the first processing mark 215. In the end plate 170F of the present embodiment, the second processing mark 216 is shaped such that the second processing mark 216 is extended from the first processing mark 215 so as to intersect the axis 176c of the cooling water supply hole 176IN at an angle 216s in a range of about 5 to 10°. That the cutting processing mark is left as described above means that the corner portion 176R of the cooling water supply hole 176IN remaining as the casting surface in the end plate 170F formed by being cast, including part of the hole circumferential wall 176H is removed by being cut.

The cutting processing mark described above is formed with a corner cutting tool Rs which is described later so as to have a predetermined cut surface roughness, and in FIG. 2B and other figures, a finish symbol (triangle symbol) corresponding to JISB0031 (1992) is attached. The triangle symbol "∇" means rough finish, and corresponds to an arithmetic average roughness Ra25. In FIG. 2B, a wave symbol or tilde (~) that does not particularly specify a surface roughness is attached to the original surface which is not subjected to the cutting processing. Hence, in the present embodiment, since the end plate 170F is an item that is formed by being cast, the original surface to which the symbol that does not particularly specify a surface roughness is attached is a casting surface. The processing around the through-hole and the surface roughness thereof are the same as on the side of the hole circumferential edge 212 and are also the same as the other supply/discharge through-holes such as the cooling water discharge hole 176OT.

The seal member 200 is molded into each of the supply/discharge through-holes such as the cooling water supply hole 176IN where the cutting processing mark is left, and is in intimate contact with the cut surface of the cutting processing mark in the supply/discharge through-hole one end side part 211 and the supply/discharge through-hole other end side part 213 and is in intimate contact with the casting surface in the hole circumferential edge 210, the hole circumferential edge 212 and the hole circumferential wall 176H other than those parts.

Figure 3A:
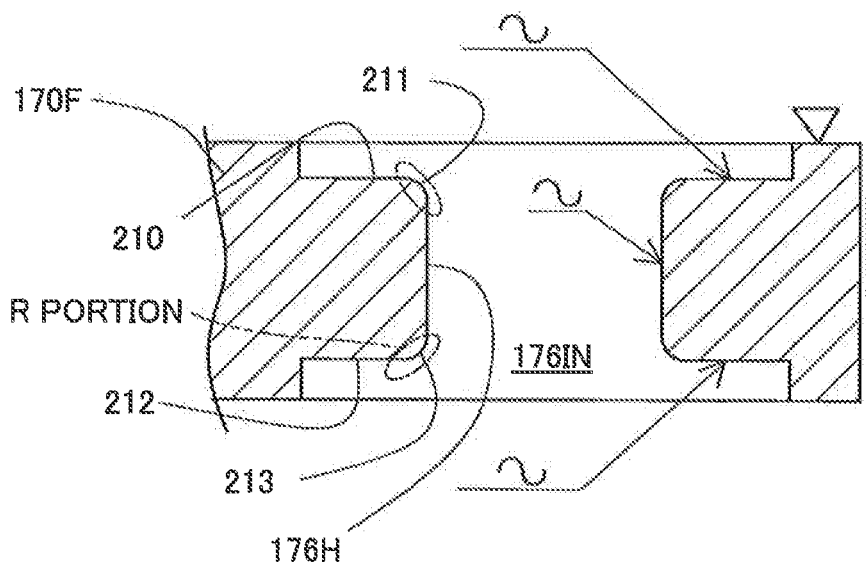
FIG. 3A is an illustrative diagram showing how an end plate is cut in the vicinity of a cooling water supply hole.
Figure 3B:
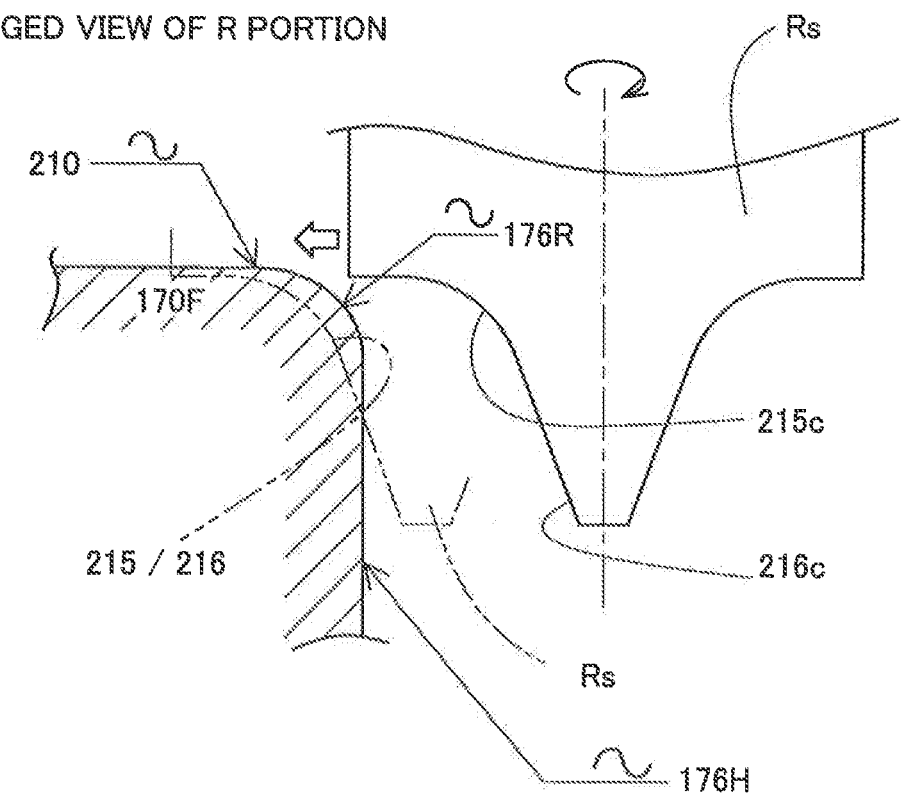
FIG. 3B is an enlarged view of an R portion thereof.
Figure 4:
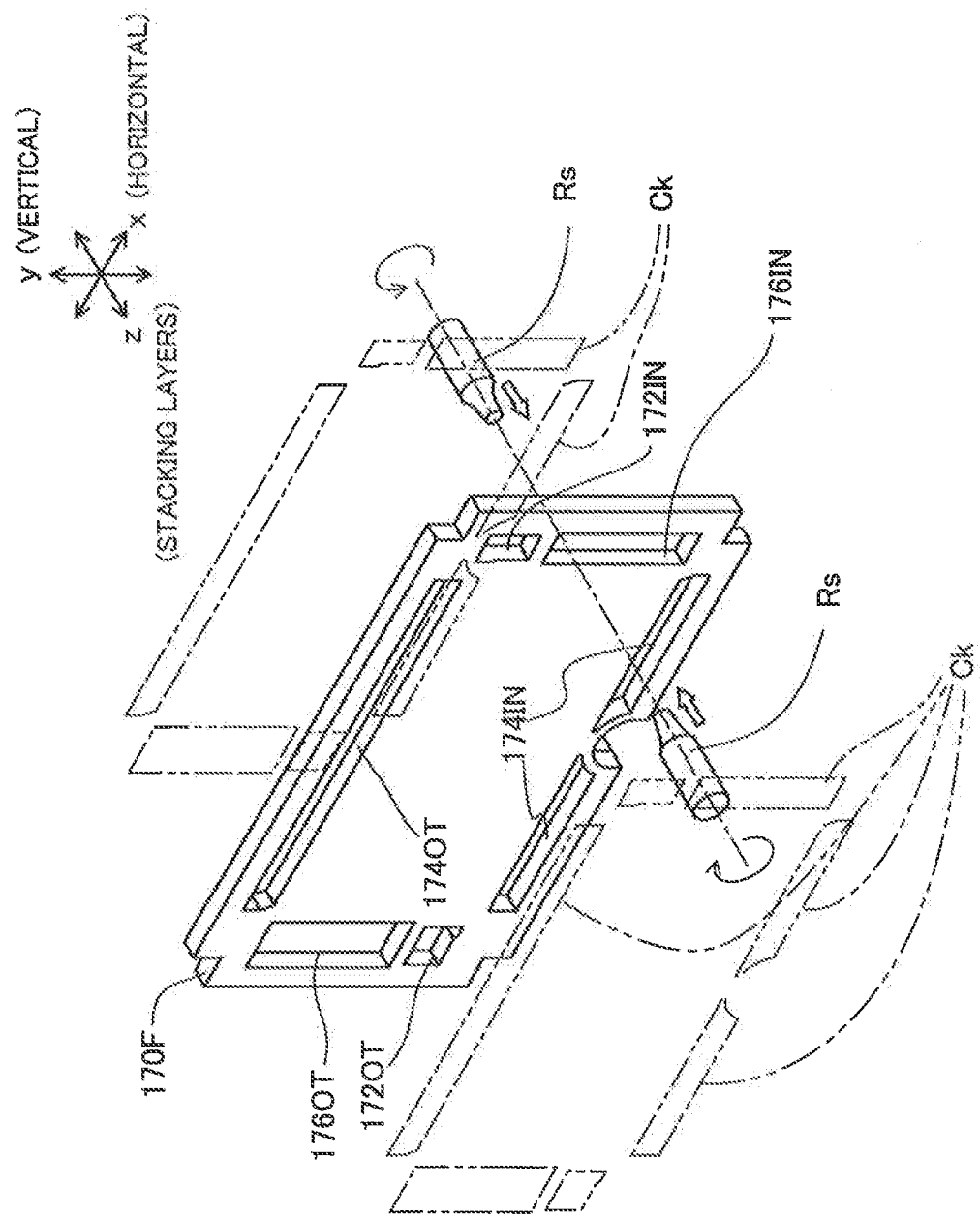
FIG. 4 is an illustrative diagram schematically showing how to cut supply/discharge through-holes with a corner cutting tool.

How the end plate 170F is cut and how the seal member 200 is formed then are described. FIGS. 3A and 3B are illustrative diagrams showing how the end plate 170F is cut in the vicinity of the cooling water supply hole 176IN, FIG. 4 is an illustrative diagram schematically showing how each of the supply/discharge through-holes is cut with the corner cutting tool Rs and FIG. 5 is an illustrative diagram schematically showing how the seal member 200 is formed.

As shown in FIG. 3A, cutting processing is performed on a plate surface on the side where the end plate 170F formed by being cast is joined to the insulating plate 165F (see FIG. 1), and the processed surface is used as a reference surface in supply/discharge through-hole processing which is described later. The end plate 170F is not limited to the planar shape as shown in FIG. 1, and is formed in the shape of an enclosure due to the fitting of an unillustrated cell peripheral device and a relationship with the supply device of the gas and the cooling water. Even in this case, in order to allow the cutting processing on the side of the hole circumferential edge 210 and the hole circumferential edge 212 of the supply/discharge through-hole such as the cooling water supply hole 176IN, as described above, cutting processing is performed on one surface of the end plate 170F. When the end plate 170F is formed in the shape of a flat plate, cutting processing may be performed on both surfaces, and each of the surfaces may be used as a reference surface in the supply/discharge through-hole processing.

As shown in the enlarged view of FIG. 3B, the corner cutting tool Rs used for the cutting processing on the hole circumferential edge 210 and the hole circumferential edge 212 in the cooling water supply hole 176IN has, at the lower end of the main body of a cylindrical cutting edge, a substantially conical cutting edge for cutting on corner processing. Then, the conical cutting edge for cutting is processed by being rotated at a high speed. The conical cutting edge for cutting includes an arc cutting edge 215c and an inclined surface cutting edge 216c that leaves the processing mark in which the first processing mark 215 and the second processing mark 216 shown in FIG. 2B are continuous, and the inclined surface cutting edge 216c is extended as a tangent from the cutting edge path of the arc cutting edge 215c. While the corner cutting tool Rs is being driven to rotate, the tip end of the cutting edge is inserted into the cooling water supply hole 176IN in the end plate 170F, and is fed by being cut to the side of the hole circumferential edge 210. In this way, the corner portion 176R remaining as the casting surface and part of the hole circumferential wall 176H following the corner portion 176R are removed by being cut with the main body of the cylindrical cutting edge of the corner cutting tool Rs and the arc cutting edge 215c and the inclined surface cutting edge 216c, with the result that the cutting processing mark in which the first processing mark 215 and the second processing mark 216 described above are continuous is left on the hole circumferential edge 210. The cutting described above is performed around the circumference of the cooling water supply hole 176IN. For example, as shown in FIG. 4, the end plate 170F is held so as to stand on an unillustrated turn table, and the corner cutting tool Rs is driven from the side of each of the front and back surfaces of the end plate 170F according to a cutting feed path CK corresponding to the shape of the opening of each of the supply/discharge through-holes such as the cooling water supply hole 176IN. In this way, in the hole circumferential edge 210 and the hole circumferential edge 212, the cooling water supply hole 176IN or other supply/discharge through-holes having the cutting processing mark in which the first processing mark 215 and the second processing mark 216 are continuous is obtained. When the end plate 170F is formed in the shape of a flat plate, both surfaces of the end plate 170F are processed, and the back and front of the end plate 170F are switched and placed on a cutting device, with the result that the first processing mark 215 and the second processing mark 210 mat be formed surface by surface.

Figure 5:
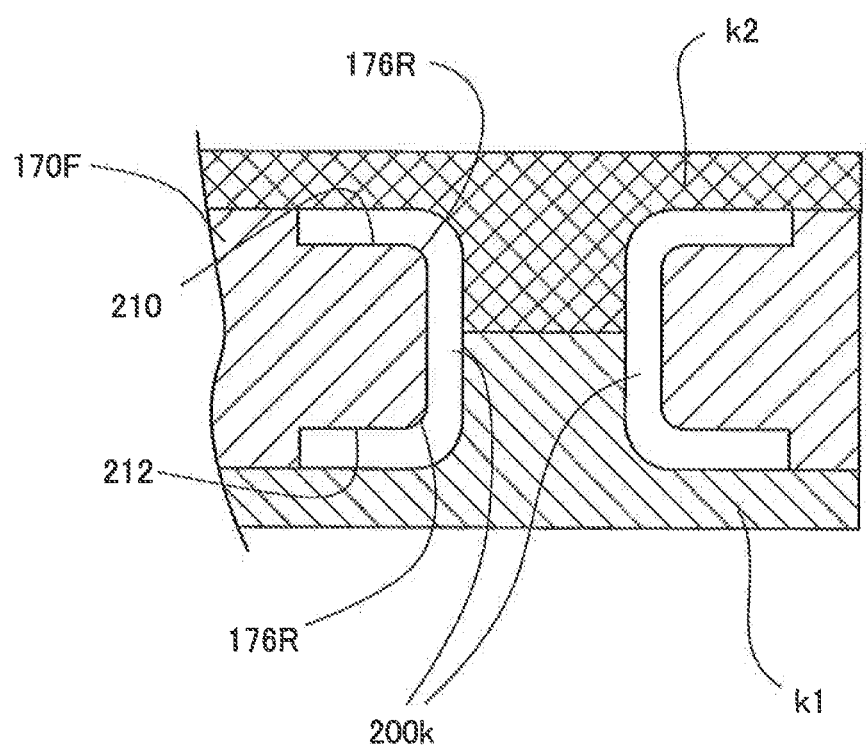
FIG. 5 is an illustrative diagram schematically showing how a seal member is formed.

As described above, when the formation of the first processing mark 215 and the second processing mark 216 in each of the supply/discharge through-holes is completed, as shown in FIG. 5, the end plate 170F is set on combined molds k1 and k2, and the resin or rubber which is the formation material of the seal member 200 is injected into a cavity 200k for the formation of the seal member 200. When mold release is performed after cooling and curing, it is possible to obtain the end plate 170F in which the supply/discharge through-holes are sealed with the seal member 200.

As described above, when in the end plate 170F included in the fuel cell 10 of the present embodiment, the hole circumferential wall 176H from the hole circumferential edge 210 at one end of each of the supply/discharge through-holes of the gas and the cooling water such as the cooling water supply hole 176IN to the hole circumferential edge 212 at the other end is sealed with the seal member 200, the supply/discharge through-hole one end side part 211 on the side of the hole circumferential edge 210 in contact with the seal member 200 and the supply/discharge through-hole other end side part 213 on the side of the hole circumferential edge 212 are cut with the corner cutting tool Rs to form the cutting processing mark on each of the parts. When the through-hole is seen in cross section, the cutting processing mark is a cutting processing mark in which in the supply/discharge through-hole one end side part 211 connecting the hole circumferential edge 210 and the hole circumferential wall 176H and the hole circumferential edge 212 connecting the hole circumferential edge 212 and the hole circumferential wall 176H, the first processing mark 215 that is a corner curved surface from the side of the hole circumferential edge 210 or the hole circumferential edge 212 and the linear second processing mark 216 that is extended as a tangent from the contact 215s of the corner curved surface in the direction of the axis 176c of the cooling water supply hole 176IN to obliquely intersect the axis 176c are continuous. Hence, as shown in FIG. 2B, the second processing mark 216 obliquely intersects the hole circumferential wall 176H, and no step is left in the hole circumferential wall 176H.

Since the end plate 170F is a casting that is cast including the cooling water supply hole 176IN, the hole circumferential wall 176H of the cooling water supply hole 176IN may be moved close to or away from the side of the axis 176c. Even if as described above, when the position of the hole circumferential wall 176H is indefinite, the corner cutting tool Rs is fed for cutting such that the arc cutting edge 215c of the corner cutting tool Rs is put on the corner portion 176R and the inclined surface cutting edge 216c is put on the hole circumferential wall 176H, the second processing mark 216 is continuously extended as a tangent from the first processing mark 215 without any step left in the hole circumferential wall 176H. If the corner cutting tool Rs is excessively fed for cutting, as long as the corner cutting tool Rs puts the inclined surface cutting edge 216c on the hole circumferential wall 176H, the second processing mark 216 is continuously extended as a tangent from the first processing mark 215 without any step left in the hole circumferential wall 176H. Consequently, in the end plate 170F included in the fuel cell 10 according to the present invention, even when the seal member 200 is significantly contracted by a decrease in temperature, it is possible to prevent stress concentration from being produced in the supply/discharge through-hole one end side part 211 connecting the hole circumferential edge 210 and the hole circumferential wall 176H and the supply/discharge through-hole other end side part 213 connecting the hole circumferential edge 212 and the hole circumferential wall 176H, with the result that any damage on the seal member 200 is avoided.

Although as shown in FIG. 2B, in the hole circumferential edge 210, a step is left as the cutting mark of the main body of the cylindrical cutting edge of the corner cutting tool Rs, when the seal member 200 is contracted by a decrease in temperature, the seal member 200 is contracted so as to be moved away from this step. Hence, even if the step is left in the hole circumferential edge 210, the damage of the seal member is not affected. The same is true for the hole circumferential edge 212.

In the end plate 170F included in the fuel cell 10 according to the present invention, the second processing mark 216 and the first processing mark 215 are cut such that the second processing mark 216 is a linear processing mark which is extended from the contact 215s on the corner curved surface of the first processing mark 215 in the direction of the axis 176c of the cooling water supply hole 176IN. In the processing mark when the through-hole is seen in cross section, a linear part is a tangent on the curved line. Hence, since the first processing mark 215 and the second processing mark 216 are smoothly continuous without being bent, even in the p art where both the processing marks are continuous, stress concentration is prevented from being produced in the seal member 200. Consequently, in the end plate 170F included in the fuel cell 10 according to the present invention, any damage on the seal member 200 is reliably avoided.

The end plate 170F included in the fuel cell 10 according to the present invention is formed by being cast including the supply/discharge through-holes such as the cooling water supply hole 176IN before the end plate itself receives the cutting process. Hence, in the end plate 170F included in the fuel cell 10 according to the present invention, the productivity is enhanced and the cost is reduced.

When in the end plate 170F included in the fuel cell 10 according to the present invention, the second processing mark 216 is extended from the first processing mark 215 toward the axis 176c of the cooling water supply hole 176IN, the second processing mark 216 is formed as a processing mark such that the angle 216s formed by intersection of a straight line connected to the corner curved surface when the through-hole is seen in cross section with the axis 176c falls within a range of 5 to 45°. Thus, the second processing mark 216 intersects the hole circumferential wall 176H at an angle of 5 to 45°. Hence, the continuity to the hole circumferential wall 176H is enhanced. Consequently, in the end plate 170F included in the fuel cell 10 according to the present embodiment, even when the temperature is repeatedly increased and decreased, since stress concentration is unlikely to be produced in the seal member 200, the effectiveness of the prevention of any damage on the seal member 200 is more enhanced.

In the fuel cell 10 of the present embodiment, a plurality of unit cells 100, that is, the fuel cell cells serving as the power generation units are stacked in layers, and the terminal plate 160F and the terminal plate 160E are provided on the side of one end and on the side of the other end in the stacking direction. In the fuel cell 10 of the present embodiment, the end plate 170F that avoids any damage on the seal member 200 is incorporated, and thus it is possible to enhance the durability of the fuel cell 10 and increase the life of the battery. In the fuel cell 10 of the present embodiment, it is possible to reduce the manufacturing cost by replacing the end plate of an existing fuel cell with the end plate 170F.

Figure 6A:
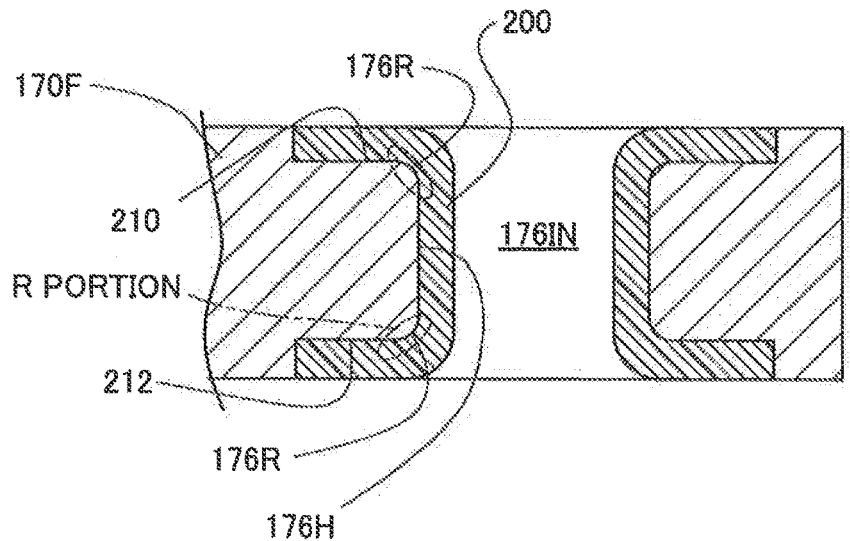
FIG. 6A is an illustrative diagram showing, according to FIG. 2, the outline of the second processing mark that is formed in the end plate of a second embodiment.
Figure 6B:
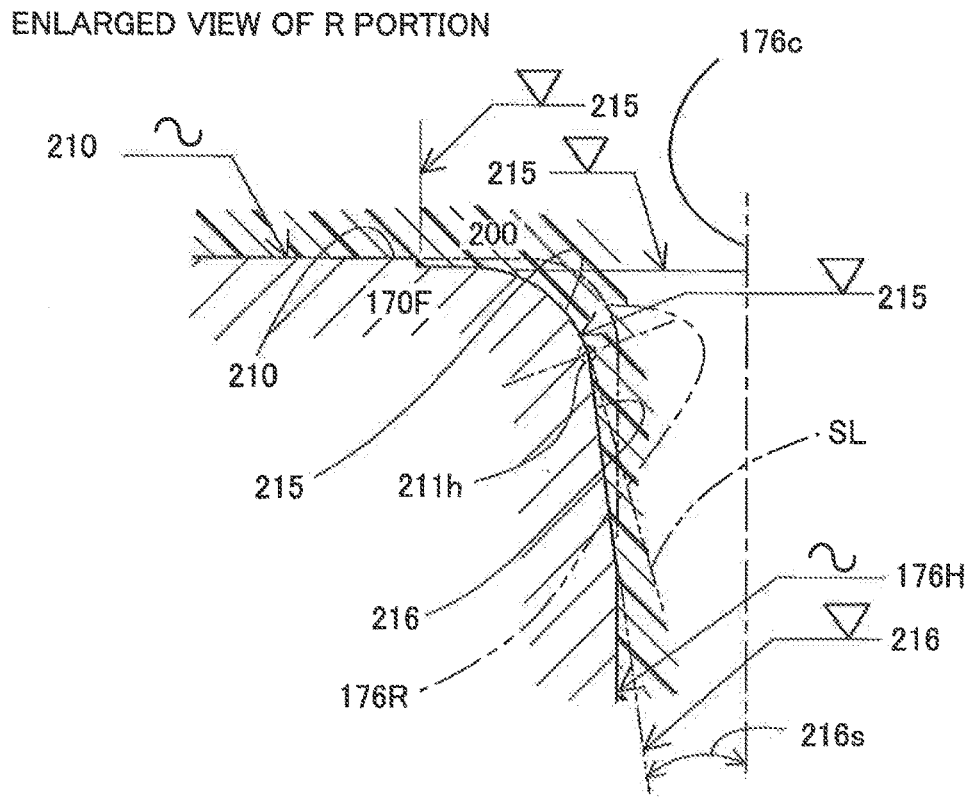
FIG. 6B is an enlarged view of an R portion thereof.
Figure 7A:
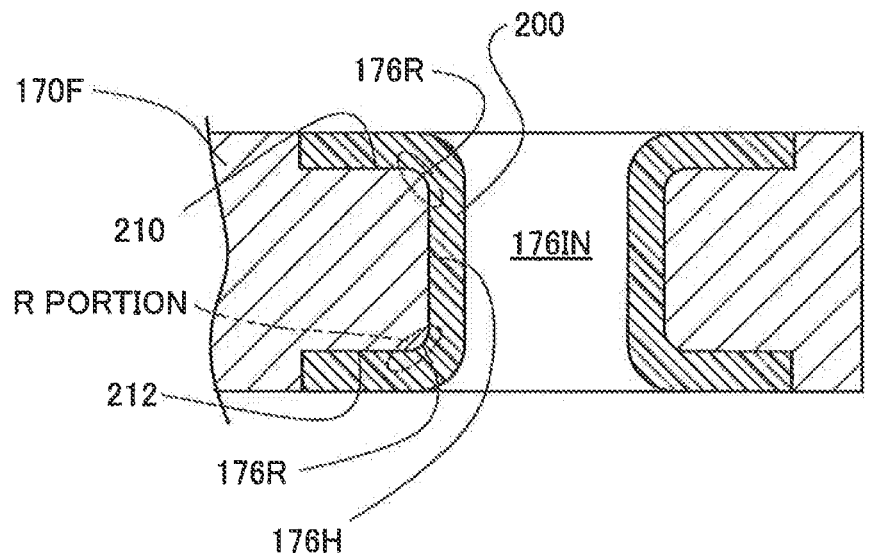
FIG. 7A is an illustrative diagram showing, according to FIG. 2, the outline of the second processing mark that is formed in the end plate of a third embodiment.
Figure 7B:
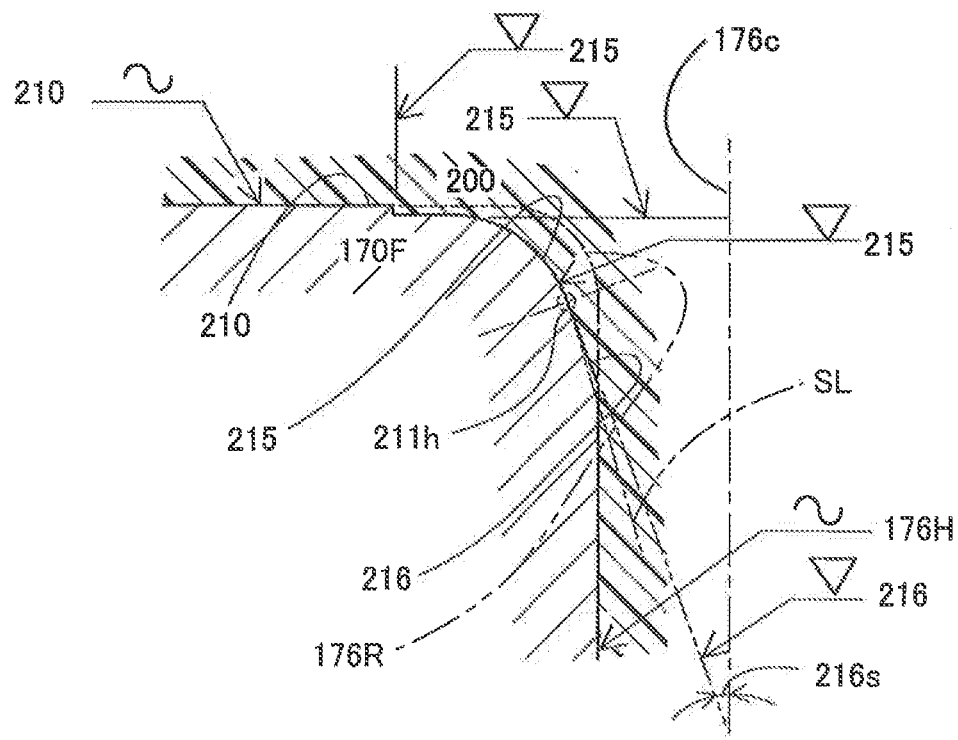
FIG. 7B is an enlarged view of an R portion thereof.
Figure 8A:
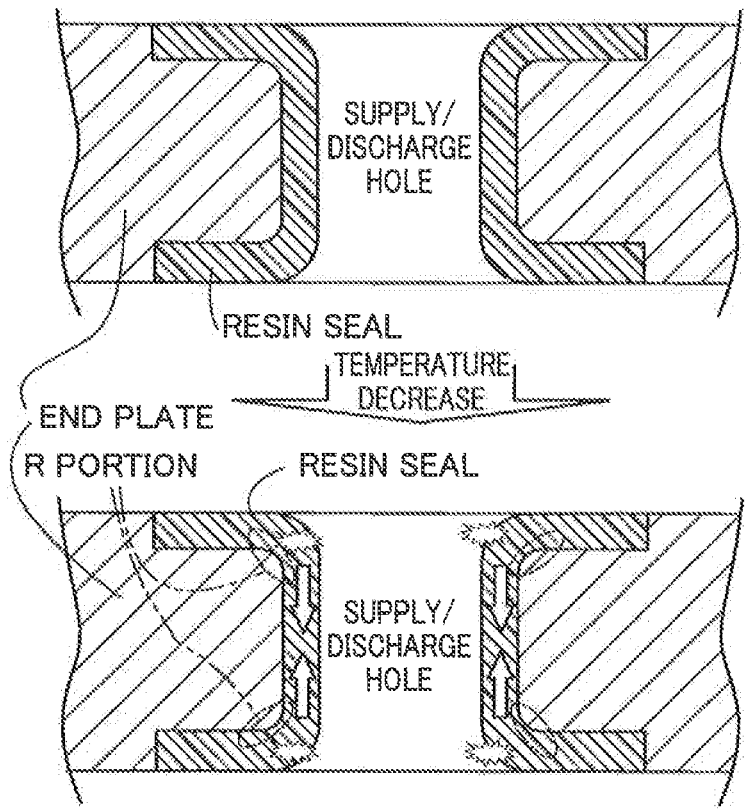
FIG. 8A is an illustrative diagram for illustrating a problem when the supply/discharge through-hole of the end plate is sealed including the circumferential edges on the upper and lower sides of the hole.
Figure 8B:
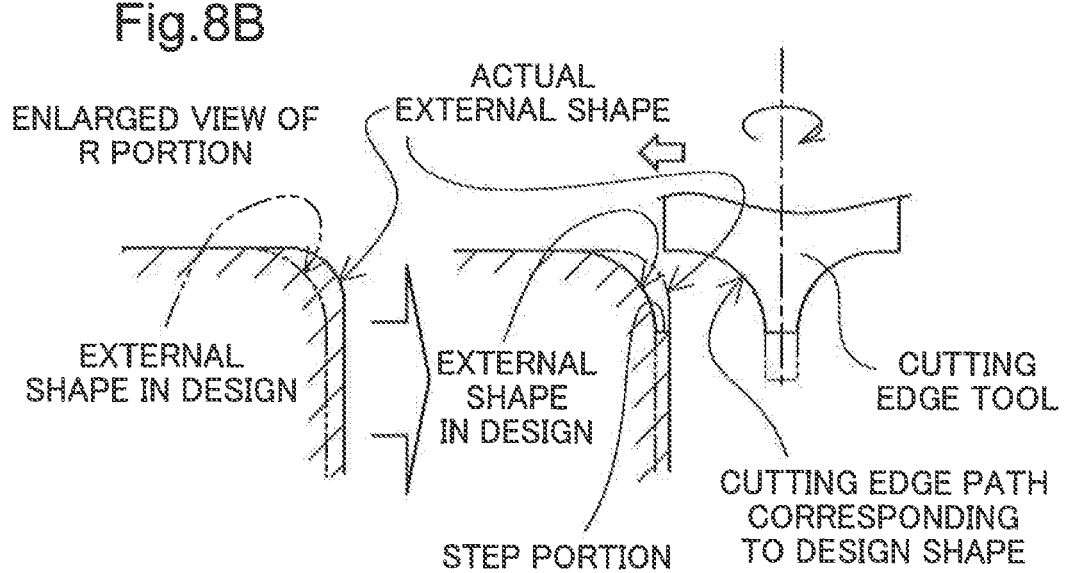
FIG. 8B is an enlarged view of an R portion thereof.

Other embodiments then are described. FIGS. 6A and 6B are illustrative diagrams showing, according to FIGS. 2A and 2B, how the second processing mark 216 is formed in the end plate 170F of the second embodiment, and FIGS. 7A and 7B are illustrative diagrams showing, according to FIGS. 2A and 2B, how the second processing mark 216 is formed in the end plate 170F of the third embodiment.

The second processing mark 216 shown in FIGS. 6A and 6B and FIGS. 7A and 7B has a linear shape in which the second processing mark 216 is inflected from an arbitrary inflection point 211h on the first processing mark 215, and is extended in the direction of the axis 176c along a straight line other than a tangent SL at the inflection point 211h shown in the figure when the through-hole is seen in cross section. Even when the through-hole is cut such that the second processing mark 216 has such a linear shape when the through-hole is seen in cross section, the second processing mark 216 does not leave a step in the hole circumferential wall 176H, and the area from the inflection point 211h in the first processing mark 215 to the hole circumferential wall 176H is the surface that is inclined at the angle 216s. Hence, even in these embodiments, any damage in the seal member 200 is avoided.

The present invention is not limited to the embodiments described above, and is realized in various configurations without departing from the spirit thereof. For example, the technical features of the embodiments corresponding to the technical features in the aspects described in the section of Summary of the Invention are replaced or combined as necessary so that part or the whole of the problem describe previously is solved or part or the whole of the effects described previously is achieved. When the technical features are not described as necessary features in the present specification, they are deleted as necessary.

Although in the embodiments described above, the end plate 170F is the casting that is formed by being cast including the supply/discharge through-holes such as the cooling water supply hole 176IN before the cutting processing, the end plate 170F may be a cutting processed product (cut plate) obtained by cutting a metal plate of aluminum along the external shape of the plate. The end plate may be formed of a metal other than aluminum such as titanium, stainless steel or an alloy such as gunmetal. Even in the cut plate described above, when the supply/discharge through-holes are sealed with the seal member 200, in order to form the supply/discharge through-holes such as the cooling water supply hole 176IN having a rectangular shape shown in FIG. 1, it is necessary to cut, at one end, a rectangular pilot hole smaller than the external shape of the supply/discharge through-hole of a design shape with an existing cutting tool such as a drill or an end mill. Then, since the end plate 170F serving as the cut plate in which the pilot hole has been formed is equivalent to the end plate 170F formed by being case including the supply/discharge through-hole before the cutting process, the first processing mark 215 and the second processing mark 216 are preferably formed with the corner cutting tool Rs shown in FIG. 3B. The end plate before the through-hole is processed may be formed by die-casting or forging instead of being formed by casting. The plate before the through-hole is processed may be the casting surface without being processed or may be adjusted to have a given shape such as by simple cutting.

What is claimed is:

1. A fuel cell end plate that is provided at an end portion of a fuel cell, the fuel cell end plate comprising:
 a through-hole which penetrates the end plate and through which at least one of a fuel gas, an oxygen containing gas and cooling water used in the fuel cell is distributed; and
 a seal which covers an inner circumferential surface of the through-hole and a circumferential edge surface around the through-hole,
 wherein a corner portion connected from the inner circumferential surface of the through-hole to the circumferential edge surface includes a cutting processing mark, and
 the cutting processing mark is a continuous processing mark including
  a curved surface processing mark that is formed with a curved surface from any one of the inner circumferential surface and the circumferential edge surface toward a side of the other surface; and
  a linear processing mark that is formed from the curved surface processing mark to the other surface and that is a straight line in a cross section in an axial direction of the through-hole,
 wherein the linear processing mark is a processing mark in which an angle formed by intersection of the straight line with an axis of the through-hole falls within a range of 5 to 45°.

2. The fuel cell end plate according to claim 1, wherein the linear processing mark is a processing mark which is a straight line that is a tangent from the curved surface in the axial direction of the through-hole in the cross section in the axial direction of the through-hole.

3. The fuel cell end plate according to claim 1, wherein the fuel cell end plate is formed by being cast while including the through-hole before receipt of cutting process in which the cutting processing mark is left.

4. A fuel cell comprising:
a fuel cell stack in which a plurality of electric generating cells are stacked; and
the fuel cell end plate according to claim 1 which is provided at an end portion of the fuel cell stack in a direction in which the cells are stacked.

5. A method of manufacturing a fuel cell end plate provided at an end portion of a fuel cell, the method comprising:
 providing a through-hole which penetrates the end plate and through which at least one of a fuel gas, an oxygen containing gas and cooling water used in the fuel cell is distributed;
 performing cutting processing on a corner portion connected from an inner circumferential surface of the through-hole to a circumferential edge surface around the through-hole; and
 arranging a seal member on the corner portion on which the cutting processing has been performed, the inner circumferential surface of the through-hole and the circumferential edge surface,
 wherein a cutting tool is used in the cutting processing to cut the fuel cell end plate, the cutting tool includes a curved surface processing portion that forms a curved surface processing mark from any one of the inner circumferential surface and the circumferential edge surface toward a side of the other surface and a linear processing portion that forms a linear processing mark from the curved surface processing portion to the other surface, and
 wherein the linear processing mark is a straight line in a cross section in an axial direction of the through-hole and an angle formed by intersection of the straight line with an axis of the through-hole falls within a range of 5 to 45°.

* * * * *